United States Patent [19]

Fukatsu

[11] Patent Number: 5,581,701
[45] Date of Patent: Dec. 3, 1996

[54] FACTORY AUTOMATION NETWORK SYSTEM

[75] Inventor: Noriyasu Fukatsu, Nagoya, Japan

[73] Assignee: Mitsubishi Denki Kabushiki Kaisha, Tokyo, Japan

[21] Appl. No.: 40,431

[22] Filed: Apr. 1, 1993

[30] Foreign Application Priority Data

Apr. 2, 1992 [JP] Japan .................................. 4-080798

[51] Int. Cl.⁶ ..................................... G06F 13/00
[52] U.S. Cl. ................... 395/200.01; 395/800; 395/181; 364/140
[58] Field of Search .................................. 395/800, 200; 371/11.1, 11.2, 11.3; 364/DIG. 1, DIG. 2; 370/16.1, 58.2

[56] References Cited

U.S. PATENT DOCUMENTS

| | | | |
|---|---|---|---|
| 4,354,226 | 10/1982 | Flickinger et al. | 364/DIG. 1 |
| 4,477,882 | 10/1984 | Schumacher et al. | 364/DIG. 2 |
| 4,493,076 | 1/1985 | Khimeche et al. | 371/11 |
| 4,754,427 | 6/1988 | Okayama | 364/DIG. 2 |
| 4,879,714 | 11/1989 | Maeno | 370/85.7 |
| 4,967,409 | 10/1990 | Narumiya et al. | 370/85.6 |
| 5,048,010 | 9/1991 | Nakabayashi et al. | 370/58.2 |
| 5,105,420 | 4/1992 | Ardon et al. | 370/16 |
| 5,199,025 | 3/1993 | Miwa | 370/16.1 |
| 5,257,181 | 10/1993 | Yoshikura et al. | 364/140 |
| 5,299,312 | 3/1994 | Rocco, Jr. | 395/200 |
| 5,307,353 | 4/1994 | Yamashita et al. | 371/11.2 |
| 5,307,354 | 4/1994 | Cramer et al. | 371/11.2 |

FOREIGN PATENT DOCUMENTS

| | | |
|---|---|---|
| 5991060 | 6/1984 | Japan . |
| 637051 | 1/1988 | Japan . |
| 1231594 | 9/1989 | Japan . |
| 2301339 | 12/1990 | Japan . |
| 2237167 | 4/1991 | United Kingdom . |
| 2259225 | 3/1993 | United Kingdom . |
| 2259797 | 3/1993 | United Kingdom . |

*Primary Examiner*—Alyssa H. Bowler
*Assistant Examiner*—Walter D. Davis
*Attorney, Agent, or Firm*—Sughrue, Mion, Zinn, Macpeak & Seas

[57] ABSTRACT

In a network system-in which communication of various information is executed between a plurality of parent/child stations which are connected to each other on the network, the parent/child stations comprise a latching setting data area for storing therein latching setting data, a link setting data area for storing therein a link parameter, and a data link control section executing and controlling cyclic transmitting function and transient transmitting function. The data link control section and the latching setting data area are connected to each other through a data bus.

5 Claims, 13 Drawing Sheets

FACTORY AUTOMATION NETWORK SYSTEM

FIELD OF THE INVENTION

The present invention relates to network systems each comprising a programmable controller (hereinafter referred to as "PC"), a loader and the like and, more particularly, to a network system capable of singly managing the entire network system by a parent station.

BACKGROUND OF THE INVENTION

In networks connecting plural PCs for FA (Factory Automation), the following two functions ordinarily are found together.

(1) Cyclic Transmitting Function

A cyclic transmitting function is executed in which the delivery of ON/OFF signals among units connected to each other on a network, or the delivery of numeral data or the like, are executed by serial communications that do not pass through an I/O unit. The data occurring in each station on the network is altered or modified periodically and in real time.

(2) Transient Transmitting Function

A transient transmitting function is one in which a communicating station is only temporarily fixed between two stations, including a transmitting start-up initial station and a mating station, without having an effect or influence on the other stations, to execute transmitting of data.

Conventionally, the network between the PCs is arranged such that a link parameter (hereinafter referred to as "L-parameter") for controlling the network is prepared by a loader. The L-parameter is registered in a parent station, and is used to control and operate the network between the PCs. The contents of the L-parameter includes data identifying only the kinds or types of a data memory (hereinafter referred to as "link device") used by each of secondary or child stations on the network, and data for setting the capacity of the link device.

In each of the child stations, a setting (hereinafter referred to as "latching setting") can be made to control the latching/unlatching of the device into the network by a sequence parameter (hereinafter referred to as "S-parameter") for controlling operation of the PCs. By executing the latching setting at each child station, it is possible to protect the data of the device from a system-failure. The S-parameter is prepared by the loader similarly to the L-parameter, and is set for every child station. The L-parameter is contained or included in the S-parameter of the parent station.

FIG. 13 of the attached drawings is a block diagram showing an arrangement of a conventional network between the PCs. In FIG. 13, the reference numerals 1 and 2 denote stations connected to the network. Specifically, the reference numeral 1 denotes a parent station having an L-parameter for controlling the network, while the reference numeral 2 denotes each of a plurality of child stations which operate in accordance with the L-parameter. Further, the reference numeral 3 denotes each of a plurality of cables through which each station is connected to other stations. Normally, an optical fiber cable or a coaxial cable is used as each of the cables 3. The reference numeral 5 denotes a plurality of loaders for executing reading/writing of internal data within the PCs; 4 denotes a plurality of cables through which the loaders 5 are connected to the stations 1 and 2. In FIG. 13, the loaders 5 are connected to the stations 1 and 2.

FIG. 14 is a block diagram showing the arrangement within the conventional PCs (parent station 1 and child stations 2). In FIG. 14, the reference numeral 6 denotes a pair-loader transmitting and receiving control section for controlling communication of data between the loader 5 and the PCs (parent station 1 and child stations 2); 7, a data link control section for executing and controlling the cyclic transmitting function and the transient transmitting function; 8, a parameter setting data area for storing therein the S-parameter used for operating the stations and received from the loader 5; 9, a latching setting data area for storing therein the latching setting data in the S-parameter; and 10, a link setting data area for storing therein the L-parameter.

Further, the reference numeral 11 denotes a sequence program area for storing therein a sequence program received from the loader 5; 12, a sequence control section for controlling execution of the sequence program; 13, a 2-port RAM functioning as an interface (hereinafter referred to as "I/F") for communicating the data between the sequence control section 12 and the data link control section 7; and 14–19, data buses for executing transmission of the data.

FIG. 15 is a view showing an arrangement of a transmitting packet (frame) used during cyclic transmission. In FIG. 15, the reference numeral 74 denotes a packet to be transmitted; 75, a starting flag (SF) indicating the top or head of the packet 74; 76, a mating destination address (DA) to which the packet 74 is transmitted; 77, a control field (CTLF) including or containing information such as commands, a priority level and the like of the packet 74; 78, an address (SA) of a transmitting origin for transmitting the packet 74; 79, data (DATA) of the packet 74; 80, a frame check sequence (FCS) for detecting erroneous transmission by the packet 74; and 81, an end flag (EF) for indicating an end of the packet 74.

Here, it is assumed that an operator determines or decides a sequence program capacity, memory distribution or allocation for efficient use of the PCs, and other requisite arrangements or agreement facts, and also prepares the S-parameter and the sequence program using the loader 5 as illustrated in FIG. 14. Then, the sequence program and the prepared S-parameter are transmitted to the pair-loader transmitting and receiving control section 6 through the cable 4. If the data received by section 6 are the S-parameter, the pair-loader transmitting and receiving control section 6 transmits the received data to the parameter setting data area 8 through the data bus 14. If the data received by section 6 are the sequence program, the pair-loader transmitting and receiving control section 6 transmits the data to the sequence program area 11 through the data bus 15.

The parameter setting data area 8 stores the latching setting data from the S-parameter to the latching setting area 9, while the L-parameter is saved in the link setting area 10. The L-parameter is operative to effect transmission of the data to the data link control section 7 through the data bus 16A. The sequence control section 12 reads out the sequence program from the sequence program area 11 through the data bus 18, and reads out the S-parameter from the parameter setting data area 8 through the data bus 19, and executes the sequence program.

Furthermore, the data link control section 7 sets cyclic data generated due to cyclic communication with respect to other stations, to the 2-port RAM 13 through the data bus 16B, while the sequence control section 12 reads out cyclic data from the 2-port RAM 13 through the data bus 17, and uses the cyclic data as data for executing sequence computations.

In the above-described conventional network system, a loader 5 is connected, respectively, to every station. Each loader 5 executes the setting of the S-parameter for every other station. For this reason, if there are 64 stations, the loader 5 is required to set the S-parameter for 64 stations. Further, since the parent station 1 does not grasp the S-parameter for various child stations 2, it is impossible to grasp information such as latching setting or the like for every stations, and the like.

Next, latching/unlatching in the case where the data of the parent station 1 and of the child stations 2 are inputted and outputted at a remote location will be described. FIG. 16 shows an H/W switch 82 for setting latching/unlatching on a board or disc surface of the station. FIG. 17 is a flow chart showing the initial treatment or processing regarding the latching/unlatching at start-up of the stations. Information of the H/W switch 82 is read out (S83). It is judged in which one of the latching/unlatching positions (ON/OFF) the H/W switch 82 is set (S84). Here, if the H/W switch 82 is "ON", a program proceeds to latching processing (S85), while, if the H/W switch 82 is "OFF", the program proceeds to unlatching processing (S86).

In the conventional arrangement of a station data linked within the network, the child station 2 will be paralleled off from the data link when there is the generation of an abnormality, such as resetting or turning-off of an electric power source. In stations other than the paralleled-off station, the data existing immediately before paralleling-off of the paralleled-off child station 2 are latched.

Further, in the conventional example, in a station in which battery back-up is not provided the existence of an abnormality, resetting or turning-off of an electric power source occurs in the data link so that, in case where the child stations 2 are paralleled-off from the data link, inputting and outputting data cannot be latched. This will be described using the flow chart in FIG. 18.

In FIG. 18, the initial processing of a microcomputer within the data link control section 7, in order to establish a data link, is executed (S87). Then, the L-parameter is received from the parent station 1 (S88). It is checked whether or not the L-parameter is properly allotted with reference to a link device allotted to a local station (S89). Then, it is judged whether the checking results are OK or NG (S90). If the checking results are NG, error processing is executed (S92), and the program proceeds to step S88 in order to again receive the. L-parameter from the parent station 1. On the contrary, if the checking results are OK, a data link is established (S91).

In addition to the above, as reference technical literatures relating to the present invention, there are "BUS-TYPE INFORMATION TRANSMITTING APPARATUS" disclosed in. Japanese Patent Laid-Open No. HEI 2-301339, "FAULT INFORMATION COLLECTING SYSTEM" disclosed in Japanese Patent Laid-Open No. HEI 1-231594, "INHERENT OR INTRINSIC INFORMATION SETTING METHOD OF DISTRIBUTED-TYPE NETWORK" disclosed in Japanese Patent Laid-Open No. SHO 63-7051, and "REMOTE SUPERVISORY APPARATUS" disclosed in Japanese Utility Model Lid-Open No. SHO 59-91060.

According to the conventional network system described above:

(1) Since latching setting can be executed only individually, the latching setting must be executed for the number of stations connected to the network, and the operator must be moved around a factory in order to execute the latching setting.

(2) Since latching setting operations of the child stations cannot be monitored or supervised by the parent station, the latching setting operation for the entire network system cannot be centrally controlled or managed by the parent station.

(3) In case where a latching setting is made in the child stations by a H/W switch, it is impossible to alter or modify the contents of the latching setting.

Thus, there is a problem that, from the above-described factors or causes (1)~(3), in the conventional network system, operational efficiency is low.

Further, according to the conventional network system:

(1) In a case where a problem station connected to the network is paralleled off from the data link due to the presence of abnormalities and the like, it is impossible to choose or select in other stations the latching/unlatching of the data just or immediately before paralleling-off of the problem station.

(2) It is impossible to select latching/unlatching of the data in a case where the local stations are paralleled off from the data link in a remote I/O station.

From the above-described factors (1) and (2), there is a problem in safety and reliability in the conventional network system.

SUMMARY OF THE INVENTION

It is therefore an object of the invention to provide a network system which can improve operational efficiency and safety of the system.

It is another object of the invention to provide a network system which judges the link parameters or the latching parameters, and switches parameter transmitting paths on the basis of the judgment results.

Further, the network system according to the invention is arranged such that a latching processing control means executes a latching setting on the basis of the information of a hardware switch means and a software switch means. Specifically, the latching setting is determined or decided on the basis of a logical product of the contents of the hardware switch means and the contents of the software switch means written by latching setting of the L-parameter.

Furthermore, the network system according to the invention is arranged such that a data link control means judges the cyclic data area of an abnormal unit on the basis of information of the software switch means, to clear the cyclic area.

Moreover, the network system according to the invention is arranged such that the data link control means reads out the cyclic data of its own or another local unit which is latched on the cyclic data area of the network management unit, on the basis of the information of the software switch means.

With the arrangement of the invention, the network system judges the link parameters or the latching parameters, and switches parameter transmitting paths on the basis of the judgment results, and the latching processing control means executes the latching setting on the basis of the information of the hardware switch means and the software switch means. Thus, there is provided an advantage that the operational efficiency of the system is improved.

Further, according to the network system of the invention, the data link control means judges the cyclic data area of the abnormal unit on the basis of the information of the software switch means, to clear the cyclic area and, further, the data link control means reads out the cyclic data of the local unit which are latched on the cyclic data area of the network management unit, on the basis of the information of the software switch means. Thus, there is produced an advantage that the safety and reliability of the system is improved.

Other objects and features of this invention will become understood from the following description with reference to the accompanying drawings.

BRIEF DESCRIPTION THE DRAWINGS

DESCRIPTION OF THE PREFERRED EMBODIMENTS

Figure 1:
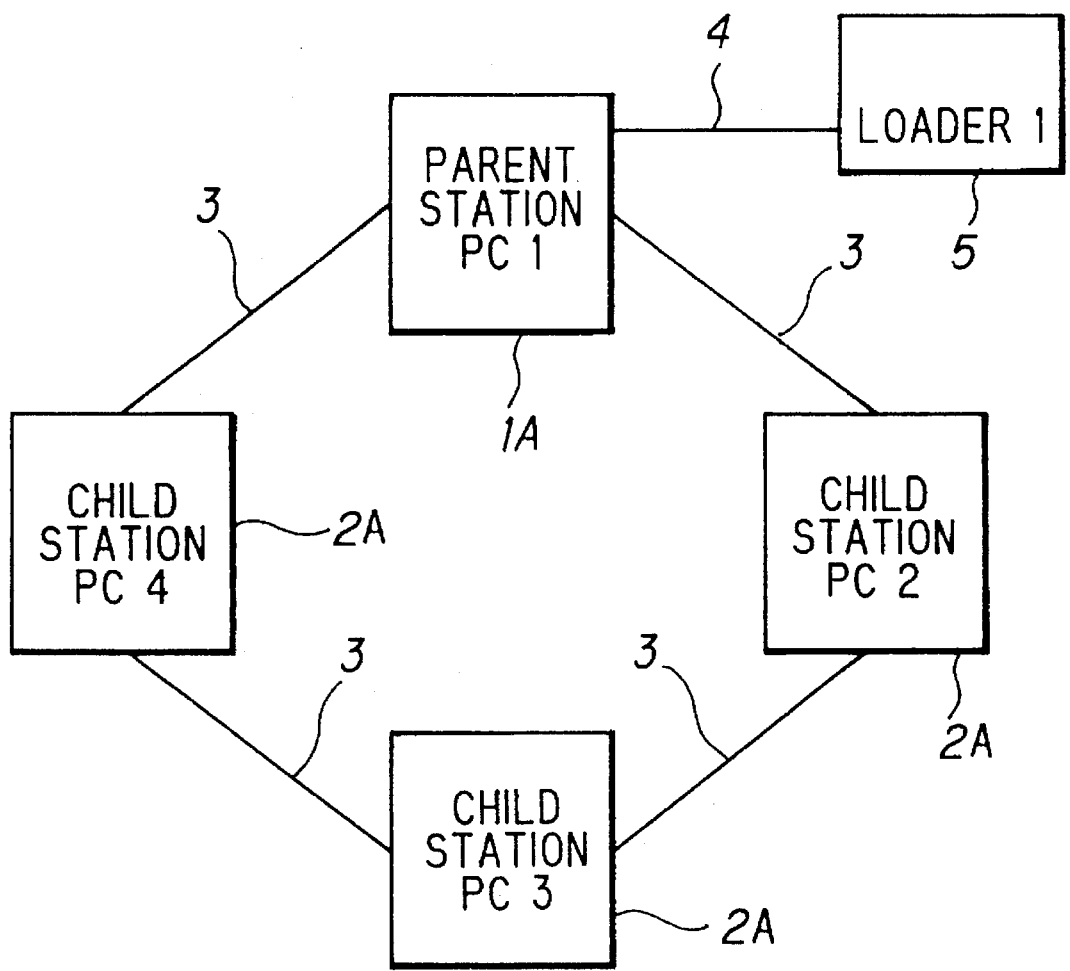
FIG. 1 is a view for explanation showing an arrangement of a network system according to the invention.

Referring first to FIG. 1, there is shown, an arrangement of a network system connecting plural PCs, according to the invention. The reference numerals 1A and 2A denote stations connected to the network. Specifically, the reference numeral 1A denotes a parent station (PC1) which has an L-parameter; and 2A denotes child stations (PC2~PC4) which execute a data link in accordance with the L-parameter. The reference numeral 3 denotes cables through which various stations used in the network are connected to each other; 5 is a loader; and 4 is a cable through which the loader 5 is connected to the parent station 1.

Figure 2:
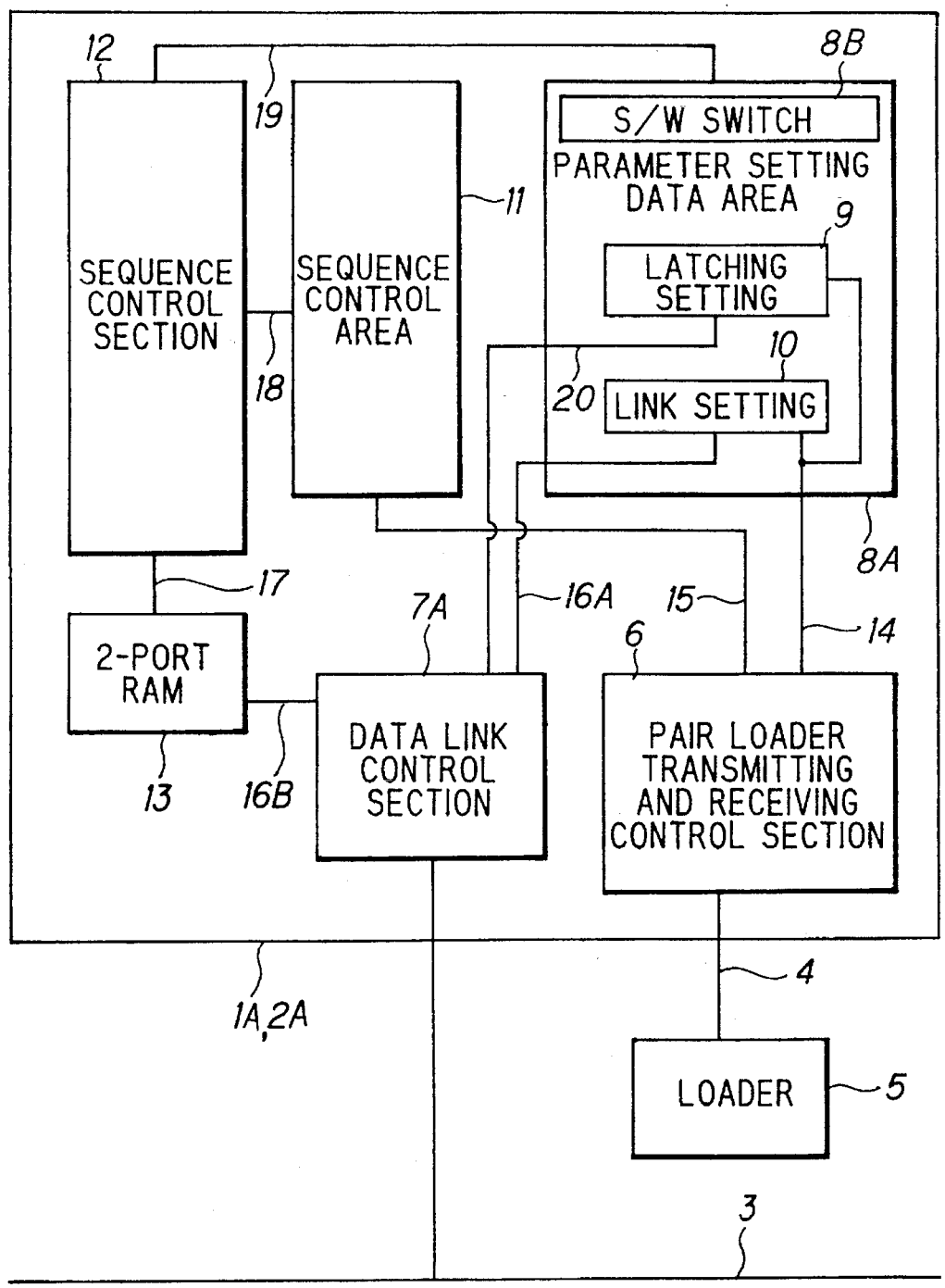
FIG. 2 is a block diagram showing an arrangement within stations of the network system according to the invention.
Figure 13:
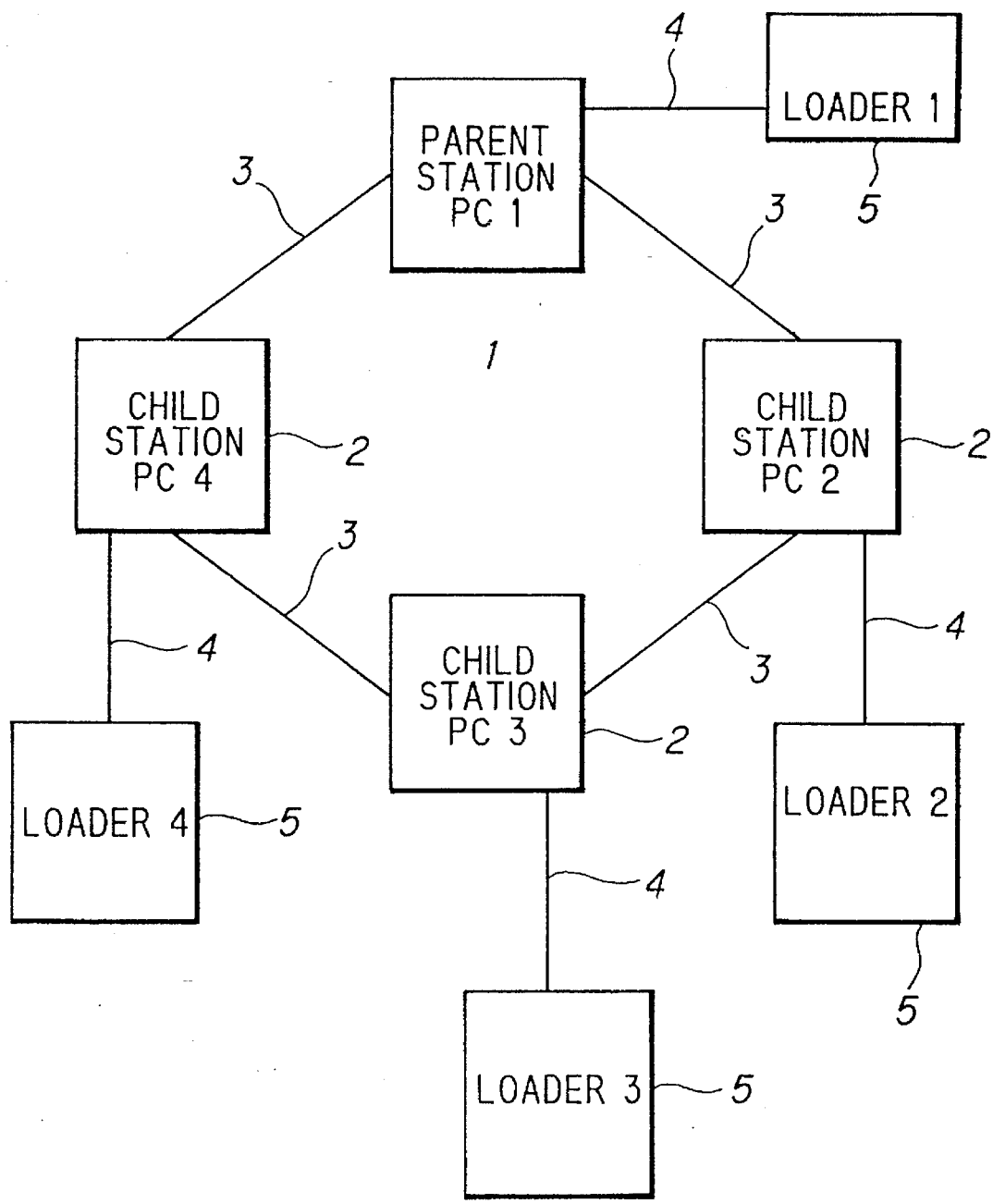
FIG. 13 is a view for explanation showing an arrangement of a conventional network.
Figure 14:
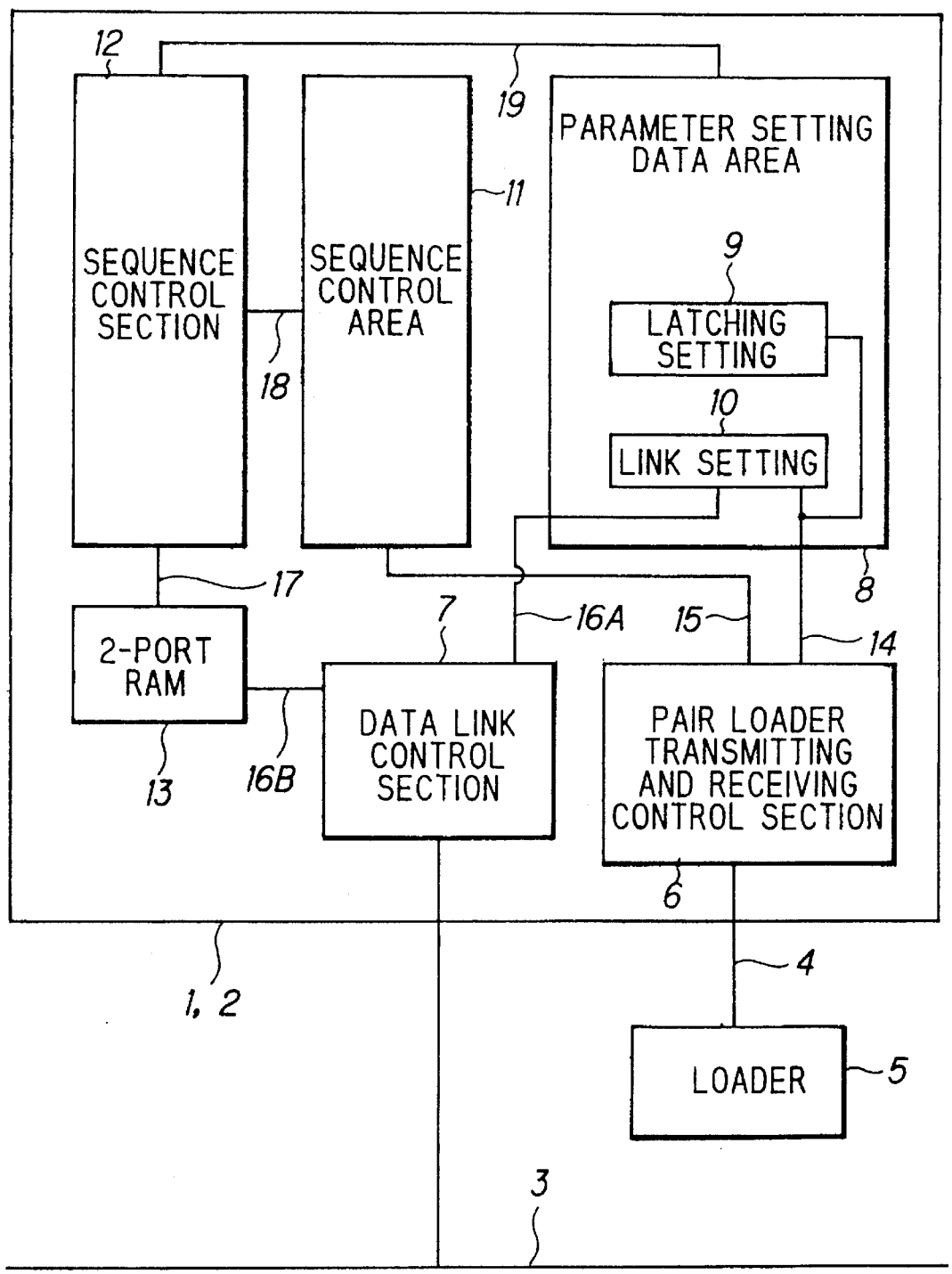
FIG. 14 is a block diagram showing an arrangement within stations in the conventional network.

FIG. 2 is a block diagram showing the interior of the stations 1A and 2A. As compared with the conventional example illustrated in FIG. 13, a data bus 20 is provided which connects a data link control section 7A and a latching setting area 9 to each other, in addition to a data bus 16A which connects the data link control section 7A and a link setting area 10 to each other. Further, a parameter setting data area 8A is provided with a software switch (hereinafter referred to as "S/W switch") 8B which executes touch setting/insetting.

Figure 3:
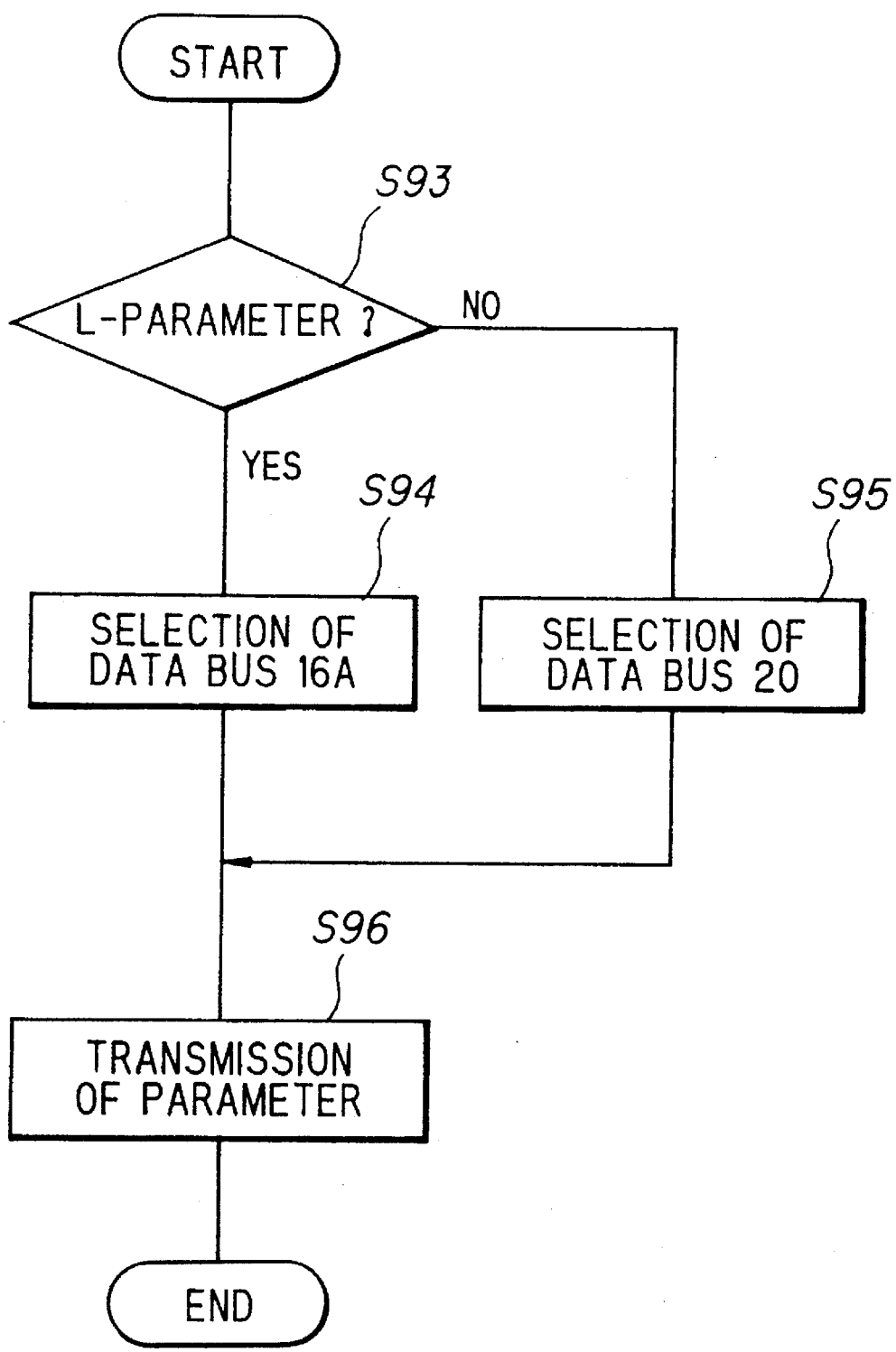
FIG. 3 is a flow chart showing operation within the stations illustrated in FIG. 2.

FIG. 3 is a flow chart showing the operation within the stations 1A and 2A illustrated in FIG. 2. The parameter setting data area 8A judges whether or not the parameter is an L(network)-parameter (S93). In case where it is judged that the parameter is the L-parameter, the data bus 16A is selected (S94). On the contrary, in case where it is judged that the parameter is not the L-parameter, that is, a S-parameter or latching parameter, the data bus 20 is selected (S95) so that each of the two different parameters is transmitted to the data link control section 7A through the corresponding one of data buses 16A and 20 (S96).

Figure 4:
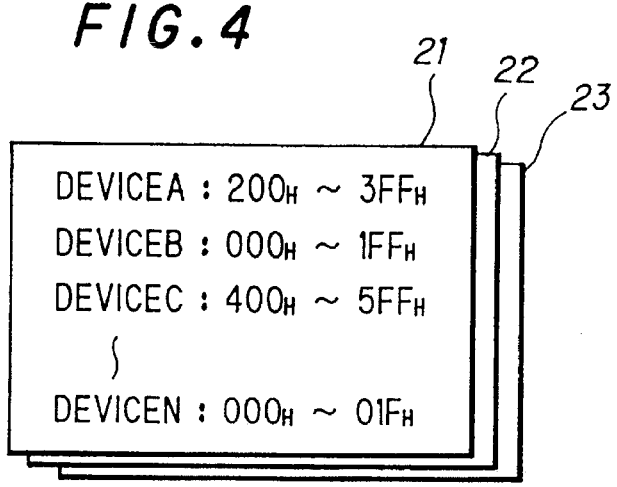
FIG. 4 is a view for explanation showing a latching setting image or picture of child stations which is executed by a parent station.
Figure 5:
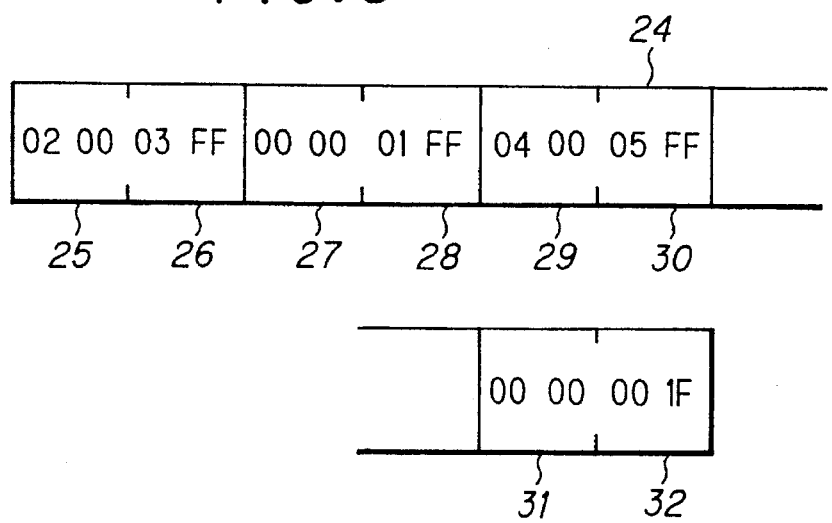
FIG. 5 is a view for explanation showing a data section of a transmitting frame which is used in latching setting communication.
Figure 6:
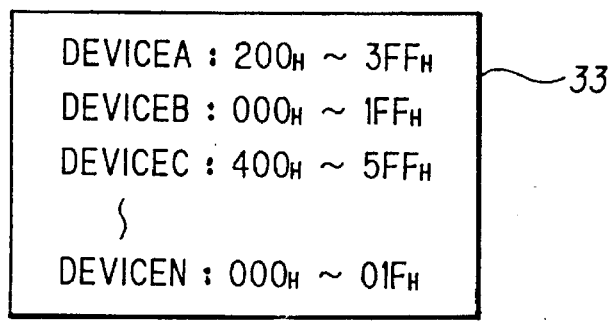
FIG. 6 is a view for explanation showing a latching setting picture of the child station which is set by the parent station.

Next, actual operation will be described with respect to FIGS. 4 through 6. FIG. 4 shows latching-range setting data with respect to each of the child stations 2A. The reference numeral 21 denotes the latching-range setting data of an L1 station; 22, the latching-range setting data of an L2 station; and 23, the latching-range setting data of an L3 station (hereinafter, the discussion of the L2 station and the L3 station will be omitted since it is the same as the L1 station). The setting data are prepared by the use of the loader 5 illustrated in FIG. 2 at the parent station 1A. The loader 5 transmits data to a pair-loader transmitting and receiving control section 6 through the cable 4. The pair-loader transmitting and receiving control section 6 transmits data illustrated in FIG. 4, to the parameter setting data area 8A through a data bus 14.

Figure 15:
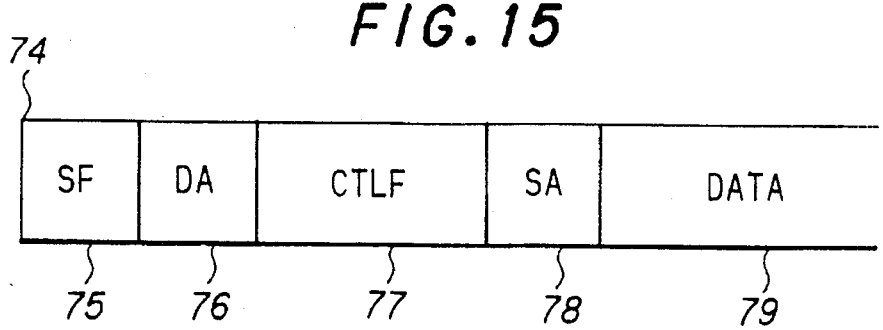
FIG. 15 is a view for explanation showing a transmitting frame which is used in cyclic transmission in the conventional network.
Figure 16:
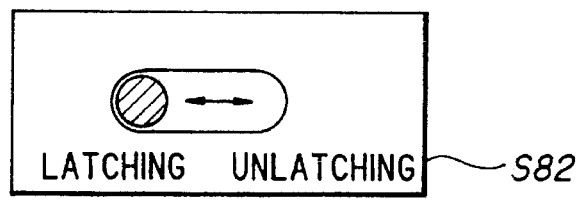
FIG. 16 is a view for explanation showing an H/W switch which is used in latching setting of a remote I/O in the conventional network.
Figure 17:
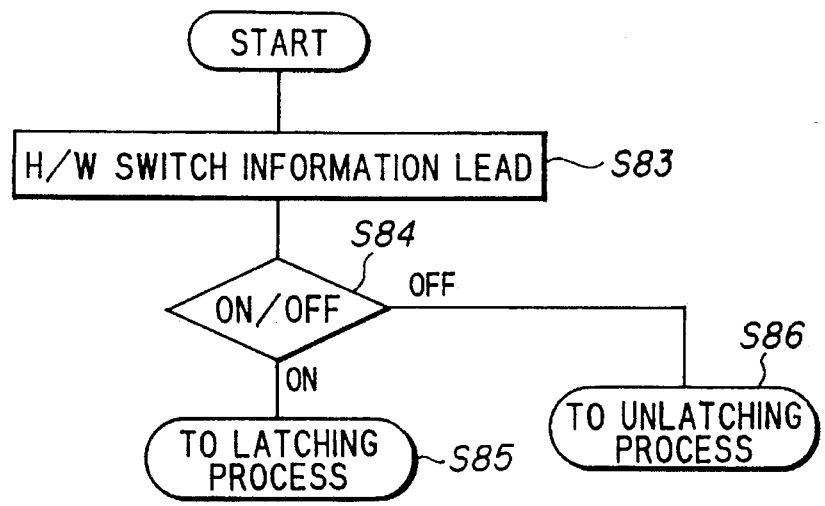
FIG. 17 is a flow chart showing processing procedure for the latching setting of the remote I/O in the conventional network.
Figure 18:
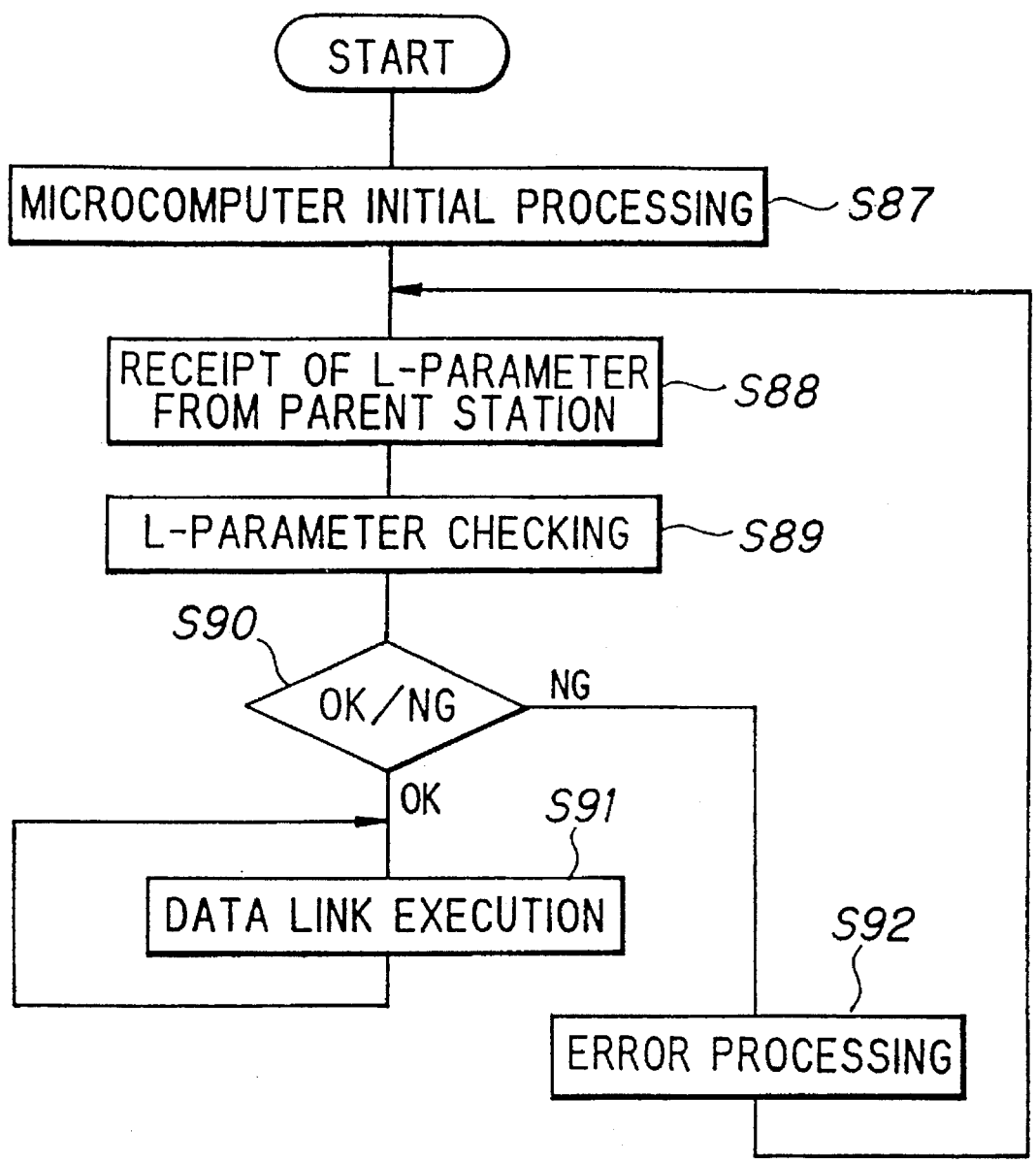
FIG. 18 is a flow chart showing procedure for initial processing of the remote I/O in the conventional network.

The parameter setting data area 8A saves the data to the latching setting area 9 and, subsequently, transmits the data to the data link control section 7A through the data bus 20 selected as described above. At the data link control section 7A, latching setting of L1 is rearranged as shown in FIG. 5. In FIG. 5, the reference numerals 25, 27, 29 and 31 denote starting device Nos. within a latching range of the various devices A, B, C and D to N; and 26, 28, 30 and 32 indicate end device Nos. within the latching range of the devices. The latching-range data are set to DATA 79 within the packet 74 illustrated in FIG. 15, and addresses of the stations and the parent station are set to DA 76 and SA 78, respectively. Similar data also are prepared with respect to the L2 station and the L3 station.

When an electric power source is turned ON after resetting, the parent station 1A executes latching setting communication by the use of the packet 74 with respect to all of the child stations 2A which are connected to the network. The latching setting communication is made once per start-up or activation of the parent station 1A, to execute latching setting. Each of the child stations 2A receives the packet 74 in the data link control section 7A illustrated in FIG. 2, and sets latching setting data to the latching setting area 9 by a procedure which is opposite to that executed by the parent station 1A. If the latching setting data are read out by the use of the loader 5 at the L1 station, the contents are brought to the contents illustrated in FIG. 6. Specifically, the latching setting for the child stations 2A, on the basis of the settings in the parent station 1A, is made possible by the use of the network.

Figure 7:
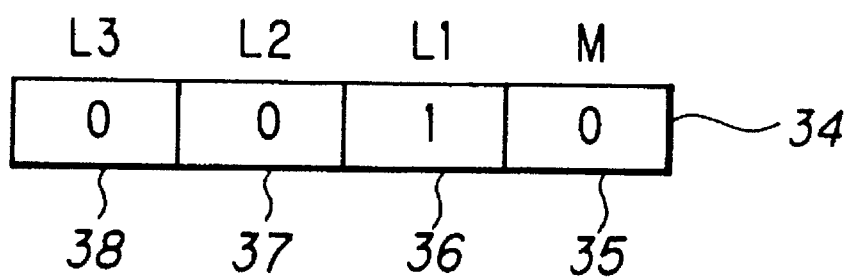
FIG. 7 is a view for explanation showing bit data of latching setting modifying circumstances of each child station which monitors or supervises the parent station.

Next, a second embodiment of the invention will be described with reference to FIGS. 7 and 8. FIG. 7 shows the content of a storage indicating the modification of latching setting data for each of the child stations 2A by the parent station 1A. The reference numeral 34 denotes a latching setting modification area. Data in the latching setting modification area 34 are stored in the latching setting area 9 illustrated in FIG. 2.

Since modification of the latching setting by the use of the loader 5 is also possible for each of the child stations 2A, in case where the parent station 1A executes latching setting by the use of the network and, subsequently, modification is executed by the loader, corresponding station bits of the latching setting modification area 34 are turned "ON". In FIG. 7, the reference numeral 35 denotes latching setting modifying data for the parent station; 36, latching setting modifying data for an L1 station; 37, latching setting modifying data for an L2 station; and 38, latching setting modifying data for an L3 station. In FIG. 7, 1 denotes the presence of a modification, while 0 denotes the absence of a modification.

Figure 8:
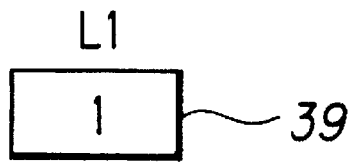
FIG. 8 is a view for explanation showing bit data of the latching setting modifying circumstances of the child station.

Modifying data 39 illustrated in FIG. 8 indicate latching setting modifying data for the L1 station. These data are stored in a latching setting area 9, similarly to the one in parent station 1A, which is illustrated in FIG. 2. Not only data for the L1 station, but for the L2 station and the L3 station, are similarly stored in the latching setting area 9. The latching setting modifying data area 34 is found within the parent station 1A, while the modifying data 39 is found within each of the child stations 2A. The parent station 1A executes readout data of the latching setting modifying circumstances together with that for each of the child stations 2A periodically, and supervises whether or not the latching setting of the child station 2A is modified.

The readout communication of the latching setting modifying data is executed by utilization of the conventional transient communication which is generally executed between the parent and child stations. In case where an operator requests readout of the latching setting data, the parent station 1A checks the latching setting modifying data area 34, and determines whether or not the requested station has a modified latching setting. If the requested station setting is not modified, the latching setting data set at the parent station 1A are identified to the operator. If the requested station 2A is modified, the parent station 1A executes a readout operation using a procedure which is opposite to that by which the parent station 1A executes latching setting of each of the child stations 2A in the first embodiment. The present station 1A also identifies latching setting data to the operator.

Figure 9:
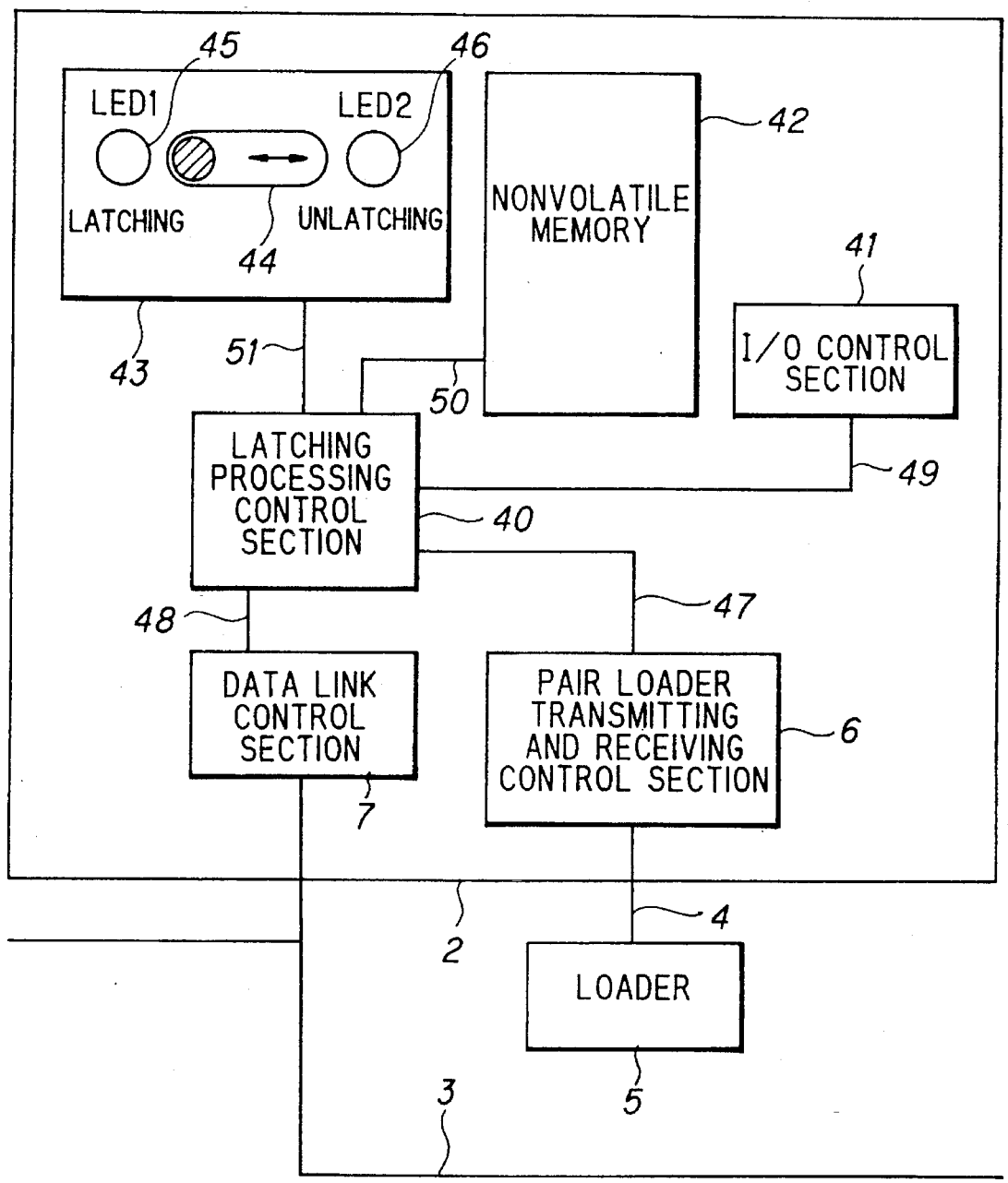
FIG. 9 is a block diagram showing an H/W switch for latching setting and its peripheral section in the network system according to the invention.
Figure 10:
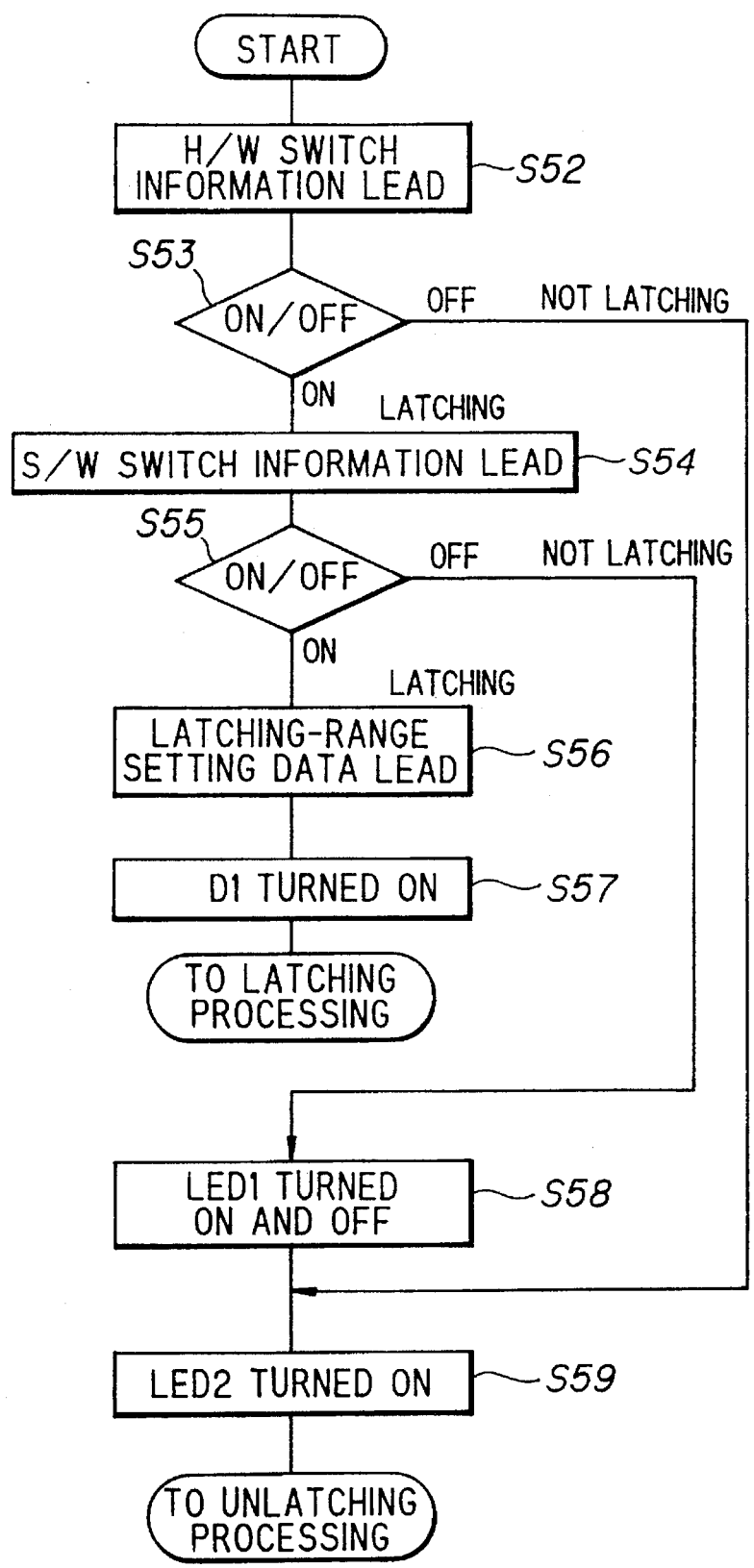
FIG. 10 is a flow chart showing procedure for modifying the latching setting.

Next, a third embodiment according to the invention will be described with reference to FIGS. 9 and 10. FIG. 9 is a block diagram showing an internal arrangement of a station (hereinafter referred to as a "remote I/O station") which inputs and outputs an ON/OFF signal of the parent station 1A for the child stations 2A illustrated in FIG. 1, at a remote location. The reference numeral 40 denotes a latching processing control section which executes latching-set data; 41, an I/O control section for executing actual inputting and outputting; 42, a non volatile memory which stores therein a software switch (hereinafter referred to as "S/W switch") set by the L-parameter; 43, a latch setting unit which is arranged on the board or disc surface of the remote I/O station; 44, is an H/W switch for executing actual latch settings; and 45 and 46 are an LED1 and an LED2, respectively, indicating the set contents. The reference numerals 47 to 51 denote data buses for transmitting data at various locations.

An operator can execute latching setting with respect to the remote I/O station by the following three kinds or types of methods:

(1) the H/W switch 44;

(2) the L-parameter from the parent station 1A; and (3) the loader 5.

In a case where the latching setting is executed by the L-parameter in accordance with method (2) described above, the remote I/O station receives the L-parameter by the data link control section 7, and stores the latching setting contents into the nonvolatile memory 42 through the latching processing control section 40. At this time, the latching processing control section 40 identifies the latching setting contents. Further, in case where setting is made by the loader in accordance with method (3) described above, the latching setting data are received by the pair-loader transmitting and receiving control section 6, and is transmitted to the latching processing control section 40 so as to be stored in the nonvolatile memory 42. The latching processing control section 40 identifies a condition or state of the H/W switch 44 through the data bus 51. Using the LED 1 and the LED 2, an LED turned-on indicates effectiveness.

In the conventional system, when a modification occurs in the latching setting, there is only the H/W switch 44. Accordingly, in case where there is a remote I/O station at a remote location, and where a manual operation is used only for dangerous circumstances, modification is difficult.

A modifying procedure due to the S/W switch, according to the invention, will be described using a flow chart illustrated in FIG. 10. First, information of the H/W switch 44 is read out (S52). Then, the switch information (ON/OFF) is judged (S53). If a setting is made to perform an "unlatching" operation, the LED 2 is turned ON (S59) to execute the unlatching processing. If the H/W switch 44 is in the "unlatching" setting, the remote I/O station executes the unlatching processing unconditionally.

In the above-described step S53, if a setting is made to the "latching" setting, the information of the S/W switch of the nonvolatile memory 42 is read out (S54), and the switching information is judged (S55). If the S/W switch is in the "unlatching" setting, but the H/W switch 44 is in the "latching" setting, the LED 1 is turned ON and OFF in order to indicate that the H/W switch 44 is modified by the S/W switch (S58). This ON-OFF signal will indicate to the operator an invalid command. Subsequently, the LED 2 is turned ON to indicate the operator that the "unlatching" setting is valid (S59).

In the step 55, in case where it is recognized that the setting is the "latching" setting, the latching-range setting data of the nonvolatile memory 42 are read out (S56), the LED 1 is turned ON (S57), and it is indicated to the operator that the latching setting is valid, to execute latching processing. By doing so, the operator is capable of freely setting latching/unlatching without relying upon the H/W switch 44.

Next, a fourth embodiment of the invention will be described with respect to the arrangement illustrated in FIG.

Figure 11:
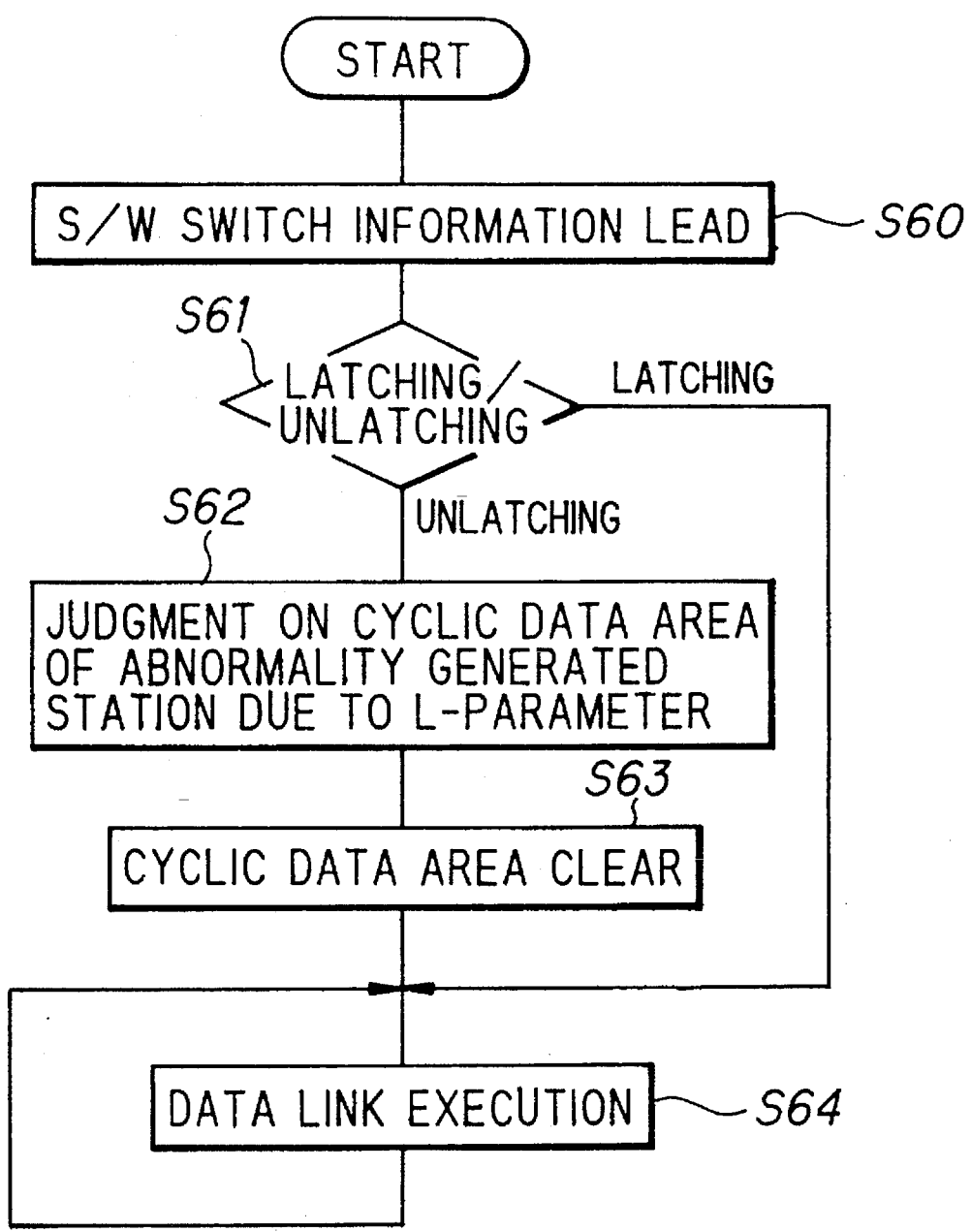
FIG. 11 is a flow chart showing procedure for clearing cyclic data of an abnormality-generated station.

2 and the flow chart illustrated in FIG. 11. First, it is assumed that an abnormality has occurred in a station which is under the execution of a data link. At this time, the abnormal station is paralleled off from the data link. A child station that is operating in a normal state or under a condition which detects other-station abnormality, reads out the contents of the S/W switch 8B (S60). The operator judges whether the cyclic data of the abnormal station are desired or are not desired to be latched with respect to the child stations (latching/unlatching) (S61). If it is "latching", the data link is executed similarly to the conventional example (S64).

On the contrary, if it is "unlatching", the cyclic data area of the abnormal station is judged from the L-parameter (S62). The cyclic data area is cleared (S63) and, subsequently, the data link is executed (S64). In the conventional example, the cyclic data of the abnormality generated station in each of the child stations 2A is maintained as latched. However, the latch can be cleared by the above-described processing.

Figure 12:
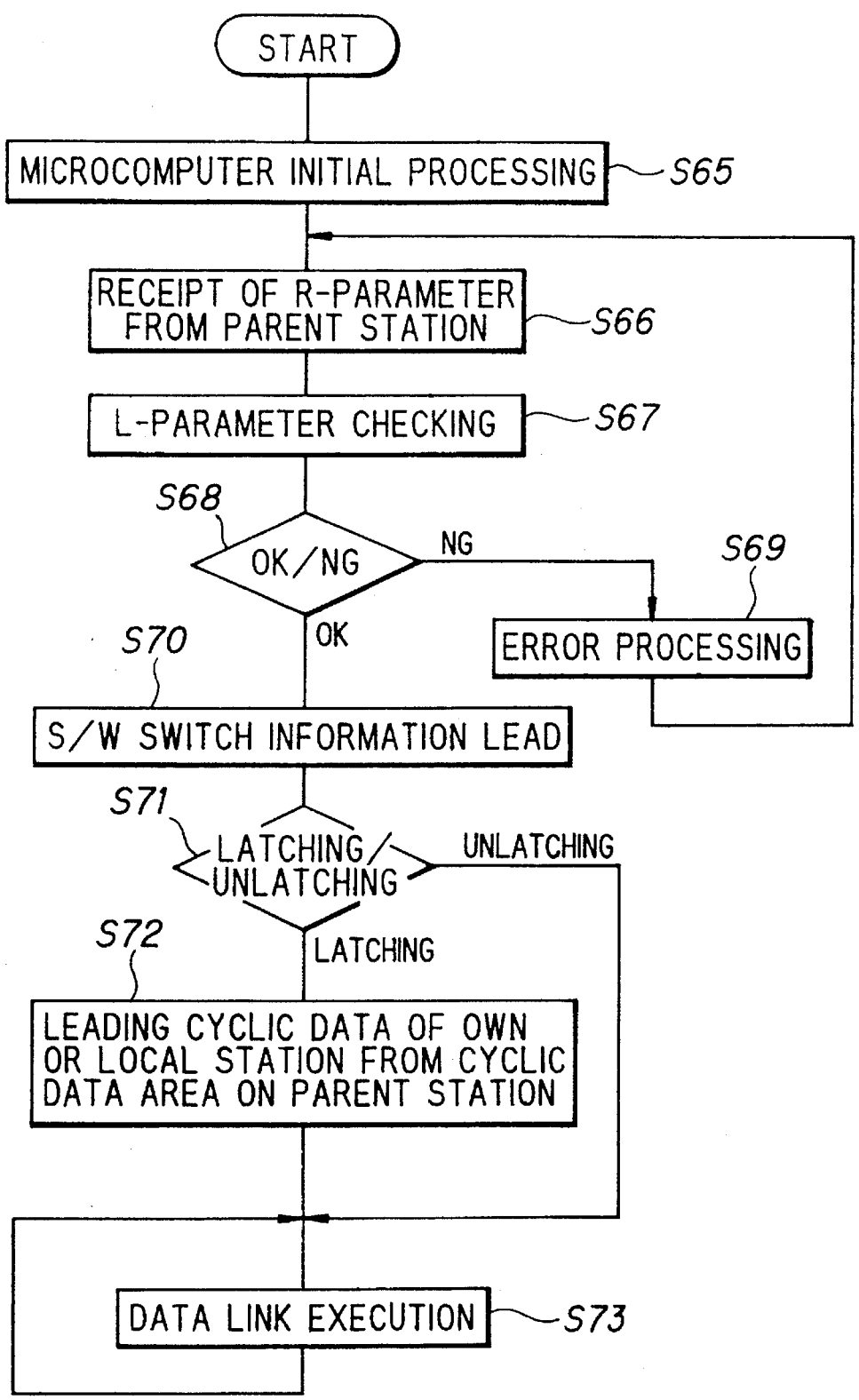
FIG. 12 is a flow chart showing procedure for initial processing of a remote I/O station.

Next, a fifth embodiment according to the invention will be described using the arrangement illustrated in FIG. 2 and a flow chart illustrated in FIG. 12. A remote I/O station executes an initial processing which brings a microcomputer in the station per se to an initial state or condition after a resetting operation or after an electric power source changes from OFF to ON (S65). Subsequently, the remote I/O station executes processing for receipt of the L-parameter from the parent station 1A (S66). The parent station 1A also executes microcomputer initial processing and, subsequently, executes transmission of the L-parameter with respect to each of the child stations. The remote I/O station checks the contents of the L-parameter, and recognizes the capacity and the kind or type of the link device which is allocated to the remote I/O station (S67).

Next, it is judged whether the checked contents are OK or NG (S68). If the checked contents are NG, error processing is executed (S69) so that the L-parameter receipt processing from the parent station 1A is again executed in the step S66. On the contrary, if the checked contents are OK, the contents of the S/W switch 8B are read out (S70), and the operator judges whether latching is desired or is not desired to be made to the remote I/O station (latching/unlatching) (S71).

After a resetting or an operation of the electric power source from OFF to ON has occurred due to occurrence of an abnormality, if it is "unlatching", the data link is executed under a condition that the cyclic data are cleared, similarly to the conventional example (S73). On the contrary, if it is "latching", the remote I/O station reads out the cyclic data of its own or of a local station which is latched on the cyclic data area of the parent station 1A (S72), whereby the remote I/O station can participate in the data link, using data stored before resetting or the change of an electric power source from OFF to ON (S73).

Specifically, even if instantaneous stoppage resulting from instability of a power source unit and the like occurs, if a "latching" setting is involved, it is possible to be returned to the data link by using the data present before occurrence of the instantaneous stoppage. Further, the operator can select a setting in accordance with system conditions or circumstances.

The above-described embodiments are similar to each other, if the embodiments are carried into effect by FA controllers, personal computers and the like. Moreover, the embodiments are similar to each other, if a network form or configuration (topology) is modified to a bus type and a star type from a loop type.

According to the above-described various embodiments, latching setting of the child stations can be executed at the parent station. Accordingly, latching setting which must be executed by connection of the loader for every child station in the conventional example can be executed solely by the parent station. Further, reading-out of the latching setting circumstances of the child stations can be executed by the parent station, whereby it is possible for the parent station to monitor or supervise the latching setting data, which is not possible in the conventional example. By doing so, it is possible to totally control or manage the latching information of the entire system solely by the parent station. Furthermore, since the contents of the latching setting set by the H/W switch of the remote I/O station can be modified by the S/W switch, in case where necessity occurs for the operator to modify the latching setting, it is possible to easily modify the contents of the latching setting, even in case where the remote I/O station is in an inconvenient location.

Moreover, in case where abnormality occurs at the other locations in the data link, the cyclic data of the abnormal station can be cleared. Further, even if abnormality occurs at the remote I/O station in data link, and the remote I/O station is temporarily paralleled off from the data link, returning to the data link can be made using the data in effect immediately before the paralleling off. Accordingly, safety of the system is improved.

Although the invention has been described with respect to specific embodiments for a complete and clear disclosure, the appended claims are not to be thus limited but are to be construed as embodying all modifications and alternative constructions that may occur to one skilled in the art which fairly fall within the basic teaching herein set forth.

What is claimed is:

1. A factory automation work system comprising:

a network;

a plurality of programmable controller units connected to each other on said network, said network being operative on the basis of network parameter data comprising at least link parameter data and latching parameter data to provide for the communication of information among said units;

each of said units comprising:

a latching setting data area for storing therein latching setting parameter data;

a link setting data area for storing therein link parameter data;

data link control means operative in response to said network parameter data for executing and controlling a cyclic transmitting function and a transient transmitting function; and a data bus through which said data link control means and said latching setting data area are connected to each other.

2. A network system as set forth in claim 1 wherein said data bus is a first data bus, said system further comprising:

a second data bus through which said data link control means and said link setting data area are connected to each other, wherein said data link control means is switchable between said first and second data buses on the basis of whether said network parameter data is a latching parameter data or a linking parameter data.

3. A factory automation network system comprising:

a network;

a plurality of programmable controller units connected to each other on said network, said network being operative on the basis of network parameter data, comprising at least link parameter data and latch parameter data, for communication of information among said units;

each of said units comprising:

first hardware switching means for executing latching setting of said unit and for generating first switch setting information;

second switching means set by link parameter data for generating second switch setting information;

latching processing control means for executing latching set data and for controlling the latching setting of said unit; and data link control means for executing and controlling a cyclic transmitting function and a transient transmitting function;

wherein said latching processing control means is operative to execute latching set data on the basis of said first switch setting information for said first switching means and said second switch setting information for said second switching means.

4. A factory automation network system for operating comprising:

a network;

a plurality of programmable controller units connected to each other on said network, said network being operative on the basis of network parameter data, comprising at least latch parameter data, cyclic parameter data and sequence parameter data, for providing communication of various information among said units;

each of said units comprising:

data link control means for executing and controlling a cyclic transmitting function and a transient transmitting function;

a cyclic parameter data area for storing therein cyclic parameter data for use in sequence computations;

a parameter setting data area for storing therein sequence parameter data; and software switching means arranged within said parameter setting data area, for executing latching setting and for generating latching setting information, wherein said data link control means is operative to judge whether to clear said cyclic parameter data area of an abnormal unit on the basis of said latching setting information of said software switching means.

5. A factory automation network system comprising:

a network;

a plurality of programmable controller units connected to each other on said network, said network being operative on the basis of network parameter data, comprising at least latch parameter data, sequence parameter setting data, and cyclic parameter data, for providing communication of various information among said units;

each of said units comprising:

data link control means for executing and controlling a cycle transmitting function and a transient transmitting function on the basis of at least sequence parameter data and cyclic parameter data;

a cyclic parameter data area for storing therein cyclic parameter data for use in sequence computations;

a sequence parameter setting data area for storing therein sequence parameter setting data; and software switching means being arranged within said parameter setting data area, and operative to execute latching setting and to generate latching setting information; and a network management unit having a cyclic parameter data area, wherein said data link control means reads out cyclic parameter data from a self-unit latched on said cyclic data area of said network management unit, on the basis of latching setting information from said software switching means.

* * * * *